United States Patent
Soman et al.

(10) Patent No.: US 7,176,835 B2
(45) Date of Patent: Feb. 13, 2007

(54) SELECTING AN OPTIMAL ANTENNA IN A GPS RECEIVER AND METHODS THEREOF

(75) Inventors: Anuradha K. Soman, Miramar, FL (US); Robert A. Marples, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 51 days.

(21) Appl. No.: 11/045,679

(22) Filed: Jan. 28, 2005

(65) Prior Publication Data

US 2006/0170590 A1    Aug. 3, 2006

(51) Int. Cl.
*G01S 5/14* (2006.01)
(52) U.S. Cl. .............. 342/357.12; 455/133; 455/277.1; 342/357.02
(58) Field of Classification Search .......... 342/357.02, 342/357.12, 357.15; 455/133–136, 277.1, 455/277.2
See application file for complete search history.

(56) References Cited

U.S. PATENT DOCUMENTS

| | | | |
|---|---|---|---|
| 5,248,981 A * | 9/1993 | Yoshihara et al. ..... | 342/357.15 |
| 5,697,075 A * | 12/1997 | Kim ......................... | 455/277.1 |
| 2002/0021244 A1* | 2/2002 | Aizawa et al. .......... | 342/357.12 |
| 2002/0107033 A1* | 8/2002 | Kim ........................... | 455/456 |
| 2003/0013470 A1* | 1/2003 | Forrester .................... | 455/456 |
| 2003/0097217 A1 | 5/2003 | Wells et al. | |
| 2003/0125078 A1* | 7/2003 | Hong ......................... | 455/456 |
| 2004/0044474 A1 | 3/2004 | Miyasaka et al. | |
| 2006/0205368 A1* | 9/2006 | Bustamante et al. ........ | 455/101 |

* cited by examiner

*Primary Examiner*—Thomas H. Tarcza
*Assistant Examiner*—Fred H Mull

(57) ABSTRACT

A global positioning system (GPS) receiver (100) for receiving signals from a plurality of GPS satellites has a plurality of antennas (102), a receiver (104) coupled to the plurality of antennas, and a processor (106) coupled to the receiver. The processor is programmed to collect (202) from the receiver information from each of the plurality of antennas corresponding to signals received from the plurality of GPS satellites, process (204) the information, identify (206) from the processed information an antenna from the plurality of antennas having a probability higher than the other antennas for accurately locating the GPS receiver, locate (210) the GPS receiver according to signals from the plurality of GPS satellites received by the antenna if (208) the probability is greater than a predetermined threshold.

15 Claims, 2 Drawing Sheets

SELECTING AN OPTIMAL ANTENNA IN A GPS RECEIVER AND METHODS THEREOF

FIELD OF THE INVENTION

This invention relates generally to global positioning systems (GPS), and more particularly to selecting an optimal antenna in a GPS receiver and methods thereof.

BACKGROUND OF THE INVENTION

For a single antenna GPS receiver to provide a reasonably accurate reading of the GPS receiver's location, generally, the single antenna must detect at least four GPS satellite signals. Depending on orientation, however, the single antenna GPS receiver may frequently fall short of detecting four GPS satellites.

The embodiments of the invention presented below overcome this disadvantage in the prior art.

SUMMARY OF THE INVENTION

Embodiments in accordance with the invention provide an apparatus and method for selecting an optimal antenna in a GPS receiver.

In a first embodiment of the present invention, a GPS receiver for receiving signals from a plurality of GPS satellites has a plurality of antennas, a receiver coupled to the plurality of antennas, and a processor coupled to the receiver. The processor is programmed to collect from the receiver information from each of the plurality of antennas corresponding to signals received from the plurality of GPS satellites, process the information, identify from the processed information an antenna from the plurality of antennas having a probability higher than the other antennas for accurately locating the GPS receiver, and locate the GPS receiver according to signals from the plurality of GPS satellites received by the identified antenna if the probability is greater than a predetermined threshold.

In a second embodiment of the present invention, a GPS receiver for receiving signals from a plurality of GPS satellites has a plurality of antennas, a receiver coupled to the plurality of antennas, and a processor coupled to the receiver. The GPS receiver operates according to a method having the steps of collecting from the receiver information from each of the plurality of antennas corresponding to signals received from the plurality of GPS satellites, processing the information, identifying from the processed information an antenna from the plurality of antennas having a probability higher than the other antennas for accurately locating the GPS receiver, and locating the GPS receiver according to signals from the plurality of GPS satellites received by the identified antenna if the probability is greater than a predetermined threshold.

DETAILED DESCRIPTION OF THE DRAWINGS

Figure 1:
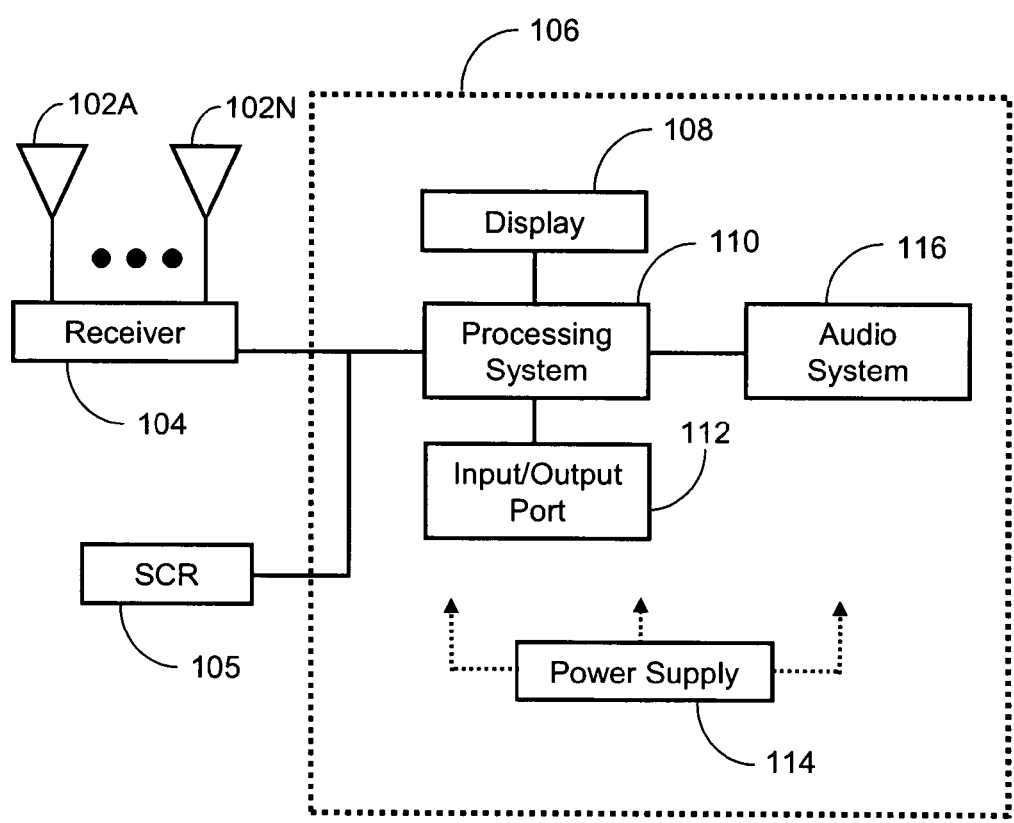
FIG. 1 is a block diagram of a global positioning system (GPS) receiver in accordance with an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is a block diagram of a GPS receiver 100 in accordance with an embodiment of the present invention. The GPS receiver 100 has conventional technology comprising a plurality of antennas 102A–102N, a receiver 104 and a processor module 106. The plurality of antennas 102 (represented by reference numerals 102A through 102N, the letter "N" corresponding to 2 or more antennas) receive signals from one or more of twenty-four GPS satellites roaming Earth's orbit. The receiver 104 utilizes conventional RF demodulation technology for down-converting GPS data operating at a carrier frequency of approximately 1.5 Giga Hertz to a signal at or near a baseband frequency (i.e., GPS data frequency).

The processor module 106 comprises conventional technology such as a display 108, an input/output port 112, an audio system 116, a processing system 110 coupled to the foregoing elements, and a power supply 114 for powering all elements of the GPS receiver 100. The display 108 is used for presenting, for example, graphical representations such as a map indicating to an end user where he or she is located. The display 108 can also be operated according to inputs applied to a conventional keypad coupled to the input/output port 112 for manipulating selectable menus of a UI (User Interface) for instructing the GPS receiver 100 on one or more selected functions to perform. The input/output port 112 can also be used for connectivity to accessories. The audio system 116 can, for example, play audible instructions for directing an end user of the GPS receiver 100 while driving.

The processing system 110 includes a conventional processor such as a microprocessor and/or a DSP (Digital Signal Processor) each operating with one or more conventional clocks (herein referred to as a clock for illustration purposes only) coupled thereto for processing signals from the receiver 104 and for controlling operation of the elements of the GPS receiver 100 in accordance with an embodiment of the present invention.

In a supplemental embodiment, the processor module 106 further includes a selective call radio (SCR) 105 for communicating with other end users through a conventional communication network such as a cellular network. In this embodiment, the SCR 105 comprises conventional technology for exchanging voice and/or data messages between devices coupled to the communication network much like a conventional cellular phone. Similar to other elements of the GPS receiver 100, the SCR 105 operates under the control of the processor module 106.

Among other functions, the processor module 106 is programmed to determine the position of the GPS receiver 100 by triangulating its position by measuring the distance between itself and a number of GPS satellites. This is accomplished in part by multiplying the velocity of signals transmitted by each GPS satellite (traveling at the speed of light) and the time traveled by said signals to the GPS receiver 100. GPS satellites transmit pseudo-random pulses (PRP) at precise known times. By measuring the instant when the pulses arrive, the processor module 106 can determine the distance to each GPS satellite. However, the atomic clocks on board the GPS satellites are extremely accurate relative to the clock of the processor module 106. Prior to synchronizing its clock to the GPS satellites, the processor module 106 calculates an estimated range to each acquired GPS satellite. This range is an approximate distance measured according to the unsynchronized GPS time kept by the processor module 106 relative to every GPS satellite the receiver 104 has acquired.

In order for the processor module 106 to determine a precise position it has to synchronize its own clock with the atomic clock of the GPS satellites. A clock error in the processor module 106 of a few nanoseconds can result in a position error in as much as several hundred meters. The processor module 106 accomplishes this by shifting in time its own generated copy of the PRP code to match the PRP code transmitted by a GPS satellite, and by comparing this code shift with its own internal clock. This process is repeated with every satellite signal the receiver 104 locks on to.

Three GPS satellites can provide only a two-dimensional (2D) position for the processor 104 to determine the location of the GPS receiver 100. The elevation of the GPS receiver 100 would have to be provided to the processor module 106 to ascertain the third dimension and thereby calculate a precise fix. Without this, a fix of the GPS receiver 100 can be off by several kilometers. A fourth GPS satellite signal, however, provides the processor module 106 enough information to synchronize its clock to that of the GPS satellites and thereby calculate a relatively accurate location (1 to 3 meters).

A variety of factors, however, may prevent the GPS receiver 100 from triangulating to a relatively accurate 3D position. These factors include, but are not limited to, receiver noise, multipath interference, ionosphere interference, and harsh landscape conditions such as valleys, large structures, canyons, and dense tree cover, which singly or in combination can be exacerbated by relying on a single antenna of a GPS receiver that happens to be poorly aligned with the GPS satellites.

Figure 2:
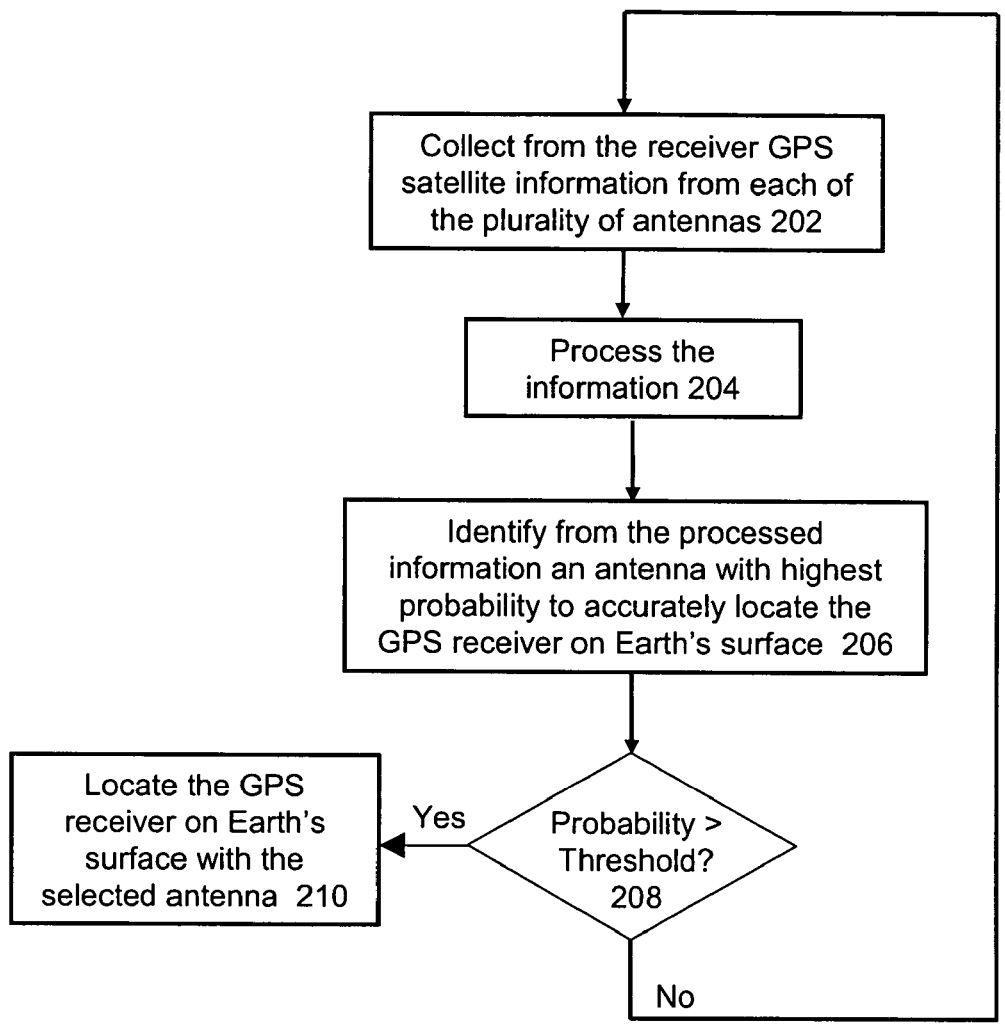
FIG. 2 is a flow chart depicting a method operating in the GPS receiver in accordance with an embodiment of the present invention.

FIG. 2 is a flow chart depicting a method 200 operating in the GPS receiver 100 in accordance with an embodiment of the present invention that overcomes this limitation in the art. The method 200 begins with step 202 where the processor module 106 collects from the receiver 104 information from each of the plurality of antennas 102A–102N corresponding to signals received from the GPS satellites as described above. In step 204, the processor module 106 processes the information, and in step 206 identifies from the processed information an antenna 102 having a probability higher than the other antennas 102A–102N for accurately locating the GPS receiver 100. In step 208, if the processor 106 detects the probability is greater than a predetermined threshold, then the processor 106 proceeds to step 210 where it locates the GPS receiver 100 according to signals from the GPS satellites received by the antenna 102 selected. If in step 208 the probability falls below the predetermined threshold, then the processor 106 repeats the foregoing steps until an antenna 102 is identified having a probability higher than the predetermined threshold.

In the processing and identification steps 204–206 the processor 106 evaluates the data it collects from each of the plurality of antennas 102A–102N. From each antenna 102 the processor 106 determines a probability of calculating an accurate location of the GPS receiver 100. A probability can be assessed by applying to each antenna 102, singly or in combination, any number of measurable factors. Such factors can include, for example, Identifying antennas 102 acquiring four or more GPS satellites;

Rejecting antennas 102 that detect less than four GPS satellites, unless one or more of the antennas 102 have detected three GPS satellites and precise elevation information is available to the processor 106 from a separate source (e.g., keyed in by an end user of the GPS receiver 100);

Rejecting antennas 102 that detect less than three GPS satellites;

Measuring a Signal to Noise Ratio (SNR) for each signal from the GPS satellites acquired by each antenna 102;

Determining accuracy of locking onto the PRP code of each GPS satellite for each antenna 102;

Determining a confidence level in synchronizing the clock of the processor 106 to the atomic clocks of the GPS satellites acquired by each antenna 102;

Collecting historical data on the information provided by the receiver 104 with respect to the GPS satellites for each cycle of the method 200, applying said historical data to the processing step to improve the accuracy of the identification, and determining a probability of success therefrom.

The predetermined threshold assures that the even if an antenna 102 is found with a probability greater than the others 102A–102N, the probability of determining a successful location needs to be sufficient to provide an end user of the GPS receiver 100 with a useful reading. The threshold can be selectable by the end user of the GPS receiver 100 or pre-programmed in the GPS receiver 100 by the vendor of said device. An end user may choose to set, for example, a high threshold (e.g., 99%) to be sure that the reading is as accurate within the conventional limits provided by the U.S. Government managing the constellation of GPS satellites (e.g., +/−3 meters). At lower thresholds (e.g., 90%) the processor 106 can determine a location from the selected antenna 102 as described above and calculate with conventional techniques an estimated range of error for the threshold selected.

In light of the foregoing description, it should be recognized that embodiments in the present invention could be realized in hardware, software, or a combination of hardware and software. These embodiments could also be realized in numerous configurations contemplated to be within the scope and spirit of the claims below. It should also be understood that the claims are intended to cover the structures described herein as performing the recited function and not only structural equivalents.

What is claimed is:

1. A global positioning system (GPS) receiver for receiving signals from a plurality of GPS satellites, comprising:
 a plurality of antennas;
 a receiver coupled to the plurality of antennas; and
 a processor coupled to the receiver, wherein the processor is programmed to:
  collect from the receiver information from each of the plurality of antennas corresponding to signals received from the plurality of GPS satellites;
  process the information;
  identify from the processed information an antenna from the plurality of antennas having a probability higher than the other antennas for locating the GPS receiver; and
  locate the GPS receiver according to signals from the plurality of GPS satellites received by the antenna if the probability is greater than a predetermined threshold.

2. The GPS receiver of claim 1, wherein the processor is further programmed to repeat the foregoing steps if the probability is lower than the predetermined threshold.

3. The GPS receiver of claim 1, wherein the processor is further programmed to:
   collect historical data from the information collected in each cycle of the foregoing steps; and
   apply the historical data to the process step to improve the accuracy of the identification step.

4. The GPS receiver of claim 1, wherein the process processor is further programmed to identify a number of GPS satellites detected by each of the plurality of antennas.

5. The GPS receiver of claim 1, wherein the processor is further programmed to eliminate from consideration one or more antennas from the plurality of antennas that have detected less than three GPS satellites from the plurality of GPS satellites.

6. The GPS receiver of claim 1, wherein the processor is further programmed to eliminate from consideration one or more antennas from the plurality of antennas that have detected less than four GPS satellites from the plurality of GPS satellites.

7. The GPS receiver of claim 1, wherein the processor is further programmed to return to the collection and process steps if each of the plurality of antennas have detected less than three GPS satellites from the plurality of GPS satellites.

8. The GPS receiver of claim 1, further comprising a selective call radio (SCR) coupled to a communication system for communicating with other SCRs.

9. In a GPS receiver for receiving signals from a plurality of GPS satellites comprising a plurality of antennas, a receiver coupled to the plurality of antennas, and a processor coupled to the receiver, a method comprising the steps of:
   collecting from the receiver information from each of the plurality of antennas corresponding to signals received from the plurality of GPS satellites;
   processing the information;
   identifying from the processed information an antenna from the plurality of antennas having a probability higher than the other antennas for locating the GPS receiver; and
   locating the GPS receiver according to signals from the plurality of GPS satellites received by the antenna if the probability is greater than a predetermined threshold.

10. The method of claim 9, further comprising the step of repeating the foregoing steps if the probability is lower than the predetermined threshold.

11. The method of claim 9, further comprising the steps of:
    collecting historical data from the information collected in each cycle of the foregoing steps; and
    applying the historical data to the process step to improve the accuracy of the identification step.

12. The method of claim 9, further comprising the step of identifying a number of GPS satellites detected by each of the plurality of antennas.

13. The method of claim 9, wherein the selection step comprises the step of eliminating from consideration one or more antennas from the plurality of antennas that have detected less than three GPS satellites from the plurality of GPS satellites.

14. The method of claim 9, wherein the selection step comprises the step of eliminating from consideration one or more antennas from the plurality of antennas that have detected less than four GPS satellites from the plurality of GPS satellites.

15. The method of claim 9, wherein the selection step comprises the step of returning to the collection and process steps if each of the plurality of antennas have detected less than three GPS satellites from the plurality of GPS satellites.

* * * * *